(12) United States Patent
Griesbach

(10) Patent No.: US 6,805,938 B2
(45) Date of Patent: Oct. 19, 2004

(54) CELLULOSIS FIBERBOARD BUILDING CONSTRUCTION PANEL HAVING REINFORCING BANDS ON EXPANSIVE SURFACE

(75) Inventor: William Griesbach, Lake Forest, IL (US)

(73) Assignee: Knight-Celotex, L.L.C., Northfield, IL (US)

( * ) Notice: Subject to any disclaimer, the term of this patent is extended or adjusted under 35 U.S.C. 154(b) by 0 days.

(21) Appl. No.: 10/680,454

(22) Filed: Oct. 7, 2003

(65) Prior Publication Data

US 2004/0067310 A1 Apr. 8, 2004

Related U.S. Application Data

(62) Division of application No. 10/160,999, filed on Jun. 3, 2002, now Pat. No. 6,737,115.

(51) Int. Cl.[7] .................................................. B32B 5/12
(52) U.S. Cl. ........................ 428/105; 428/107; 428/113; 428/114; 428/191; 428/192; 428/195.1; 428/292.4; 52/309.12; 52/309.13; 52/309.15; 52/309.17; 249/13; 249/30
(58) Field of Search ................................ 428/105, 107, 428/292.4, 195.1, 113, 114, 191, 192; 52/309.12, 309.15, 309.17, 309.13; 249/13, 30

(56) References Cited

U.S. PATENT DOCUMENTS

| | | |
|---|---|---|
| 4,339,405 A | 7/1982 | Paszner |
| 4,402,751 A | 9/1983 | Wilde |
| 4,406,703 A | 9/1983 | Guthrie et al. |
| RE32,329 E | 1/1987 | Paszner |
| 4,951,518 A | 8/1990 | Hendershot |
| 5,316,828 A * | 5/1994 | Miller ........................ 428/182 |
| 5,711,750 A | 1/1998 | Christensen et al. |
| 5,774,078 A | 6/1998 | Tanaka et al. |
| 5,846,894 A | 12/1998 | Singh et al. |
| 5,941,616 A * | 8/1999 | Billingham ................. 312/111 |
| 6,001,169 A | 12/1999 | Kawai |
| 6,129,718 A | 10/2000 | Wada |

* cited by examiner

Primary Examiner—Harold Pyon
Assistant Examiner—Jane Rhee
(74) Attorney, Agent, or Firm—Wood, Phillips, Katz, Clark & Mortimer

(57) ABSTRACT

A building construction panel made of cellulosic fiberboard, comprising cementitious bands of a reinforcing material, which are applied via spraying, as the panel is being conveyed, so as to cover a minor portion of the overall area of a given one of the expansive surfaces, wherein the panel is devoid of the reinforcing material except at the bands. The bands include two diagonal bands, each of which extends between diagonally opposite corners of the given one of the expansive surfaces, two longitudinal bands, each of which extends along a respective one of the longitudinal edges of the given one of the expansive surfaces, and two transverse bands, each of which extends along a respective one of the transverse edges of the given one of the expansive surfaces.

10 Claims, 1 Drawing Sheet

CELLULOSIS FIBERBOARD BUILDING CONSTRUCTION PANEL HAVING REINFORCING BANDS ON EXPANSIVE SURFACE

CROSS-REFERENCE TO RELATED APPLICATION

This application is a division of U.S. patent application Ser. No. 10/160,999, which was filed on Jun. 3, 2002 now U.S. Pat. No. 6,737,115.

TECHNICAL FIELD OF THE INVENTION

This invention pertains to a cellulosic fiberboard panel, which is a building construction panel reinforced in a novel manner. This invention contemplates that reinforcing bands, which may be cementitious, are applied on an expansive surface of a cellulosic fiberboard panel.

BACKGROUND OF THE INVENTION

Commonly, cellulosic fiberboard panels are made by severing each panel, via water jets or otherwise, from a continuous web of cellulosic fiberboard, as made on a fiberboard-making machine, such as a Fourdrinier machine, from cellulosic fibers, which may be wood fibers, bagasse fibers, or other cellulosic fibers. Cellulosic fiberboard panels are used widely in building construction, as wall sheathing, as insulating panels, as roofing underlayments, as flooring underlayments, and otherwise.

Characteristically, unless made, coated, or treated with cementitious materials, asphaltic materials, or other non-permeable materials, cellulosic fiberboard panels are permeable to water vapor. Because of their permeability to water vapor, cellulosic fiberboard panels are desirable for installations where mold or mildew might thrive unless water vapor that would be otherwise trapped could permeate such panels, such as installations of wall sheathing over spaced studs, at outer walls of buildings. However, as compared to plywood panels and to other building panels, cellulosic fibreboard panels are not as strong, unless reinforced.

As exemplified in numerous prior patents including U.S. patent Re. 32,329, which is a reissue of U.S. Pat. No. 4,339,405, and including U.S. Pat. Nos. 4,402,751, No. 4,406,703, No. 4,981,518, No. 5,744,078, No. 5,846,894, and No. 6,001,169, it has been known heretofore to blend cementitious materials with cellulosic fibers, whereby to make reinforced, water vapor-impermeable, cellulosic fiberboard panels.

SUMMARY OF THE INVENTION

In a building construction panel made of cellulosic fiberboard and having two expansive surfaces, two longitudinal edges, and two transverse edges, each expansive surface having four corners and each expansive surface having an overall area, this invention provides an improvement wherein the panel has bands of a reinforcing material, for which a cementitious material is preferred. The bands cover a minor portion of the overall area of a given one of the expansive surfaces. The panel is devoid of the reinforcing material except at the bands.

The bands may include two diagonal bands, each of which extends between diagonally opposite ones of said corners of the given one of the expansive surfaces. The bands may include two longitudinal bands, each of which extends along a respective one of the longitudinal edges of the given one of the expansive surfaces. The bands may include two transverse bands, each of which extends along a respective one of the transverse edges of the given one of the expansive surfaces. Preferably, the bands include such diagonal, longitudinal, and transverse bands.

As a method to reinforce a panel made of cellulosic fiberboard and having two expansive surfaces, two longitudinal edges, and two transverse edges, each expansive surface having four corners and each expansive surface having an overall area, this invention provides a step of wherein applying bands of a reinforcing material, for which a cementitious material is preferred, so as to cover a minor portion of the overall area of a given one of the expansive surfaces, wherein the panel is devoid of the reinforcing material except at the bands.

Two diagonal bands of the reinforcing material may be thus applied so that each of the diagonal bands extends between diagonally opposite ones of said corners of the given one of the expansive surfaces. Two longitudinal bands of the reinforcing material may be thus applied so that each of the longitudinal bands extends along a respective one of the longitudinal edges of the given one of the expansive surfaces. Two transverse bands of the reinforcing material may be thus applied so that each of the transverse bands extends along a respective one of the transverse edges of the given one of the expansive surfaces. Preferably, such diagonal, longitudinal, and transverse bands are applied so as to extend as noted.

DETAILED DESCRIPTION OF THE ILLUSTRATED EMBODIMENTS

Figure 1:
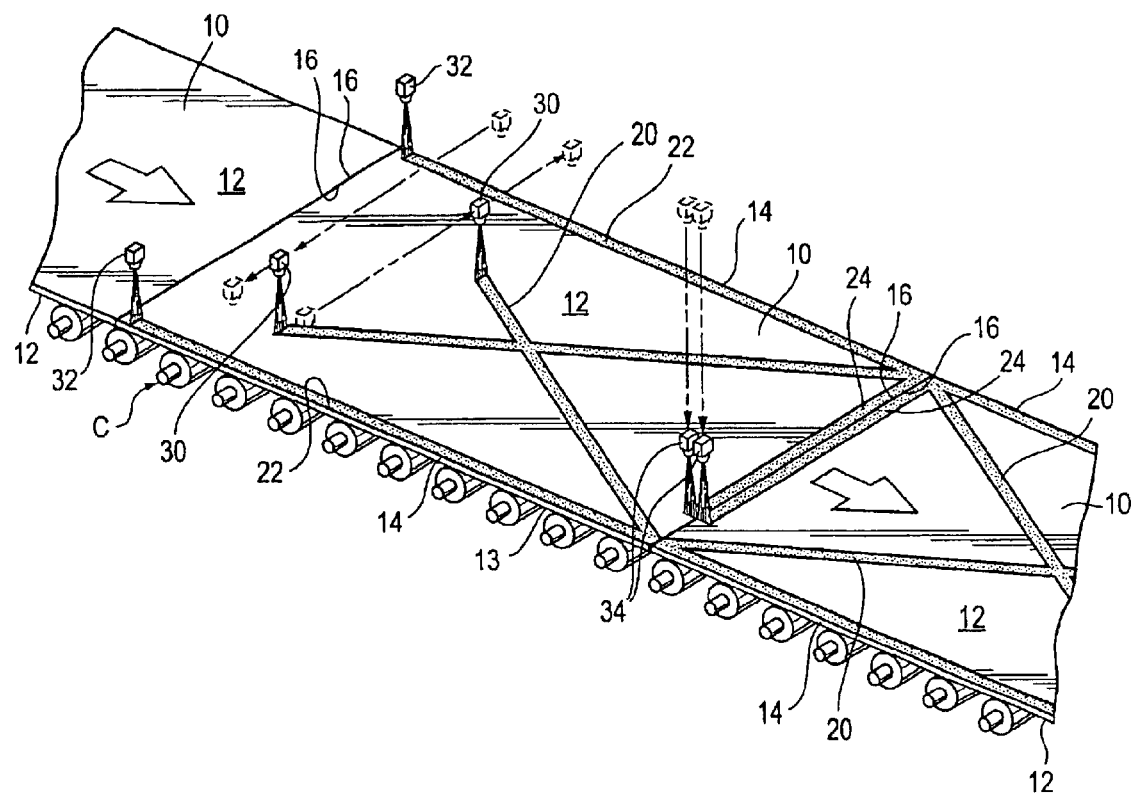
FIG. 1 is a fragmentary, perspective, somewhat schematic view of a series of cellulosic fiberboard panels being reinforced in a manner contemplated by this invention, while such panels are being conveyed.

As illustrated in FIG. 1, a series of cellulosic fiberboard panels 10 are being reinforced in a manner contemplated by this invention, while such panels 10 are being conveyed by a conveyor C from a fiberboard-making machine, such as a Fourdrinier machine, which is not illustrated. Each panel 10 has two expansive surfaces 12, two longitudinal edges 14, and two transverse edges 16, each expansive surface 12 having four corners 18 and each expansive surface 12 having an overall area. Each panel 10 is reinforced by reinforcing bands of a cementitious material, which is applied by spraying a slurry containing the cementitious material onto a given one of the expansive surfaces 12 of said panel 10 and by allowing the cementitious material to cure. The cementitious material may be one of the cementitious materials disclosed in those prior patents identified hereinbefore, the disclosures of which patents are incorporated herein by reference. Presently, the cementitious material containing an inorganic binder enveloping particles as disclosed in U.S. Pat. No. 5,846,894 is preferred.

Figure 2:
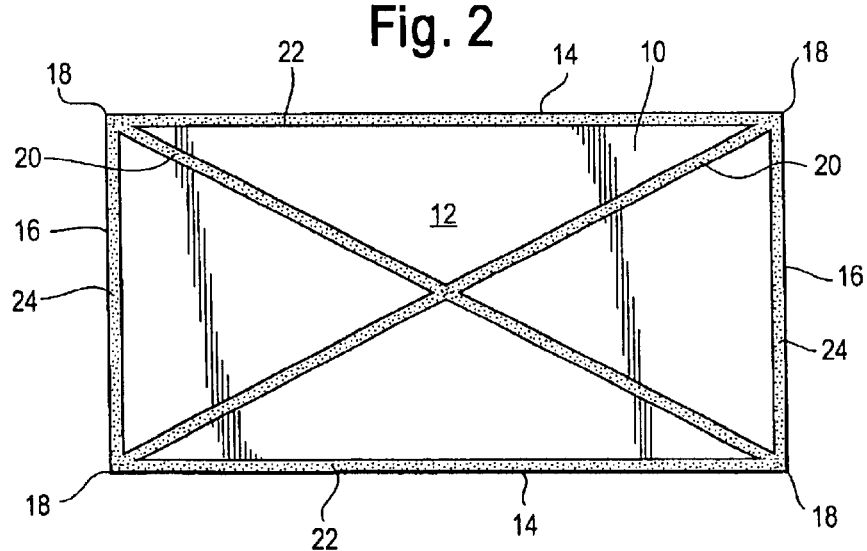
FIG. 2, on a slightly larger scale, is a top plan of a representative panel of the series, after the representative panel has been reinforced in the manner illustrated in FIG. 1.

As illustrated in FIG. 2, in which a representative panel 10 having been reinforced in the manner noted in the preceding paragraph is illustrated, the reinforcing bands of the cementitious material include two diagonal bands 20, each of which extends between diagonally opposite corners 18 of the given one of the expansive surfaces, two longitudinal bands 22, each of which extends along a respective one of the longitudinal edges 14 of the given one of the expansive surfaces 12, and two transverse bands 24, each of which extends along a respective one of the transverse edges 16 of the given one of the expansive surfaces 12. Thus, the reinforcing bands of the cementitious material form triangular patterns, which reinforce the representative panel 10. The reinforcing bands of the cementitious material, as applied, cover a minor portion of the overall area of a given one of the expansive surfaces 12. The representative panel 10 is devoid of the cementitious material except at the reinforcing bands. Thus, over a major portion of the overall area of the given one of the expansive surfaces 12, the representative panel 10 remains permeable to water vapor.

As illustrated in FIG. 1, the slurry to produce each diagonal band 20 on each panel 10 is applied via a nozzle 30, which moves transversely across each panel 10 as such panel 10 is being conveyed by the conveyor C in a longitudinal direction, which is indicated by large arrows. One such nozzle 30 leads and the other nozzle 30 trails so that the nozzles 30 do not interfere with each other. Each nozzle 30 can be continuously operated in a back-and-forth manner so as to apply the slurry to produce the diagonal bands 20 on successive panels 10 being conveyed. As illustrated in FIG. 1, the slurry to produce each longitudinal band 22 on each panel 10 is applied via a nozzle 32, which remains in a fixed position and which can be continuously operated so as to apply the slurry to produce the longitudinal bands 22 on successive panels 10 being conveyed.

As illustrated in FIG. 1, the slurry to produce the transverse band 24 on the trailing edge of a given panel 10 being conveyed and the slurry to produce the transverse band 24 on the leading edge of the next panel 10 being conveyed are applied simultaneously by tandem nozzles 34, which move diagonally across the noted panels 10 and in the longitudinal direction indicated by large arrows, from a starting position at a given side of the noted panels 10 being conveyed to a finishing position at the other side of the noted panels 10 being conveyed, as the noted panels 10 are being conveyed in the same, longitudinal direction. In FIG. 1, the starting position is at the far side of the noted panels 10 being conveyed and the finishing position is at the near side of the noted panels 10 being conveyed. The nozzles 34 are operated only when moving from the starting position to the finishing position, from which the nozzles 34 are moved to the starting position after each operation to apply the slurry to produce the transverse band 24 on the trailing edge of a given panel 10 being conveyed and the slurry to produce the transverse band 24 on the leading edge of the next panel 10 being conveyed.

What is claimed is:

1. In a building construction panel made of cellulosic fiberboard and having two expansive surfaces, two longitudinal edges, and two transverse edges, each expansive surface having four corners and each expansive surface having an overall area, an improvement wherein the panel has plural bands of a reinforcing material comprising a slurry of reinforcing material containing an inorganic binder enveloping particles cured on the panel, the bands covering a minor portion of the overall area of a given one of the expansive surfaces, and wherein the panel is devoid of the reinforcing material except at the bands.

2. The improvement of claim 1 wherein the bands include two diagonal bands, each of which extends between diagonally opposite ones of said corners of the given one of the expansive surfaces.

3. The improvement of claim 1 wherein the bands include two longitudinal bands, each of which extends along a respective one of the tranverse edges of the given one of the expansive surfaces.

4. The improvement of claim 1 wherein the bands include two transverse bands, each of which extends along a respective one of the transverse edges of the given one of the expansive surfaces.

5. The improvement of claim 1 wherein the bands include two diagonal bands, each of which extends between diagonally opposite ones of said corners of the given one of the expansive surfaces, two longitudinal bands, each of which extends along a respective one of the longitudinal edges of the given one of the expansive surfaces, and two transverse bands, each of which extends along a respective one of the transverse edges of the given one of the expansive surfaces.

6. In a building construction panel made of cellulosic fiberboard and having two expansive surfaces, two longitudinal edges, and two transverse edges, each expansive surface having four corners and each expansive surface having an overall area, an improvement wherein the panel has plural bands of a cementitious material comprising a slurry of reinforcing material containing an inorganic binder enveloping particles cured on the panel, the bands covering a minor portion of the overall area of a given one of the expansive surfaces, and wherein the panel is devoid of the reinforcing material except at the bands.

7. The improvement of claim 6 wherein the bands include two diagonal bands, each of which extends between diagonally opposite ones of said corners of the given one of the expansive surfaces.

8. The improvement of claim 6 wherein the bands include two longitudinal bands, each of which extends along a respective one of the longitudinal edges of the given one of the expansive surfaces.

9. The improvement of claim 6 wherein the bands include two transverse bands, each of which extends along a respective one of the transverse edges of the given one of the expansive surfaces.

10. The improvement of claim 6 wherein the bands include two diagonal bands, each of which extends between diagonally opposite ones of said corners of the given one of the expansive surface, two longitudinal bands, each of which extends along a respective one of the longitudinal edges of the given one of the expansive surfaces, and two transverse bands, each of which extends along a respective one of the transverse edges of the given one of the expansive surfaces.

* * * * *